United States Patent [19]

Mochimaru et al.

[11] 4,056,320
[45] Nov. 1, 1977

[54] COPYING MACHINE

[75] Inventors: Hideaki Mochimaru, Yokohama; Yugoro Kobayashi, Suginami, both of Japan

[73] Assignee: Ricoh Company, Ltd., Japan

[21] Appl. No.: 683,762

[22] Filed: May 6, 1976

[30] Foreign Application Priority Data

May 10, 1975    Japan .................................. 50-55591

[51] Int. Cl.² .............................................. G03B 27/62
[52] U.S. Cl. .......................................... 355/75; 355/50
[58] Field of Search ......................... 355/75, 25, 50, 51

[56] References Cited

U.S. PATENT DOCUMENTS

| 3,594,079 | 7/1971 | Murgas et al. | 355/50 X |
|---|---|---|---|
| 3,677,635 | 7/1972 | Van Auken et al. | 355/25 X |
| 3,741,646 | 6/1973 | Knechtel et al. | 355/50 |
| 3,743,406 | 7/1973 | Komori et al. | 355/50 |
| 3,994,582 | 11/1976 | Goshima et al. | 355/75 |

Primary Examiner—Richard A. Wintercorn
Attorney, Agent, or Firm—McGlew and Tuttle

[57] ABSTRACT

The copying machine permits a selective use of either a single sheet original, or a file original such as a book, and in which an original is moved by means of rollers for scanning an image thereof. A plurality of drive rollers are disposed on the under side of a path of movement of an original to be copied, whereas mating driven rollers are mounted on a movable frame so that they can be retracted from their normal position when a file original is used. The frame is manually moved to the retracted position without substantial change in its posture, thereby permitting an operator to easily operate the frame. After the frame is retracted, a file original may be placed on a transparent sheet member which is arranged to be fed on the drive roller so as to be moved thereby for scanning.

7 Claims, 11 Drawing Figures

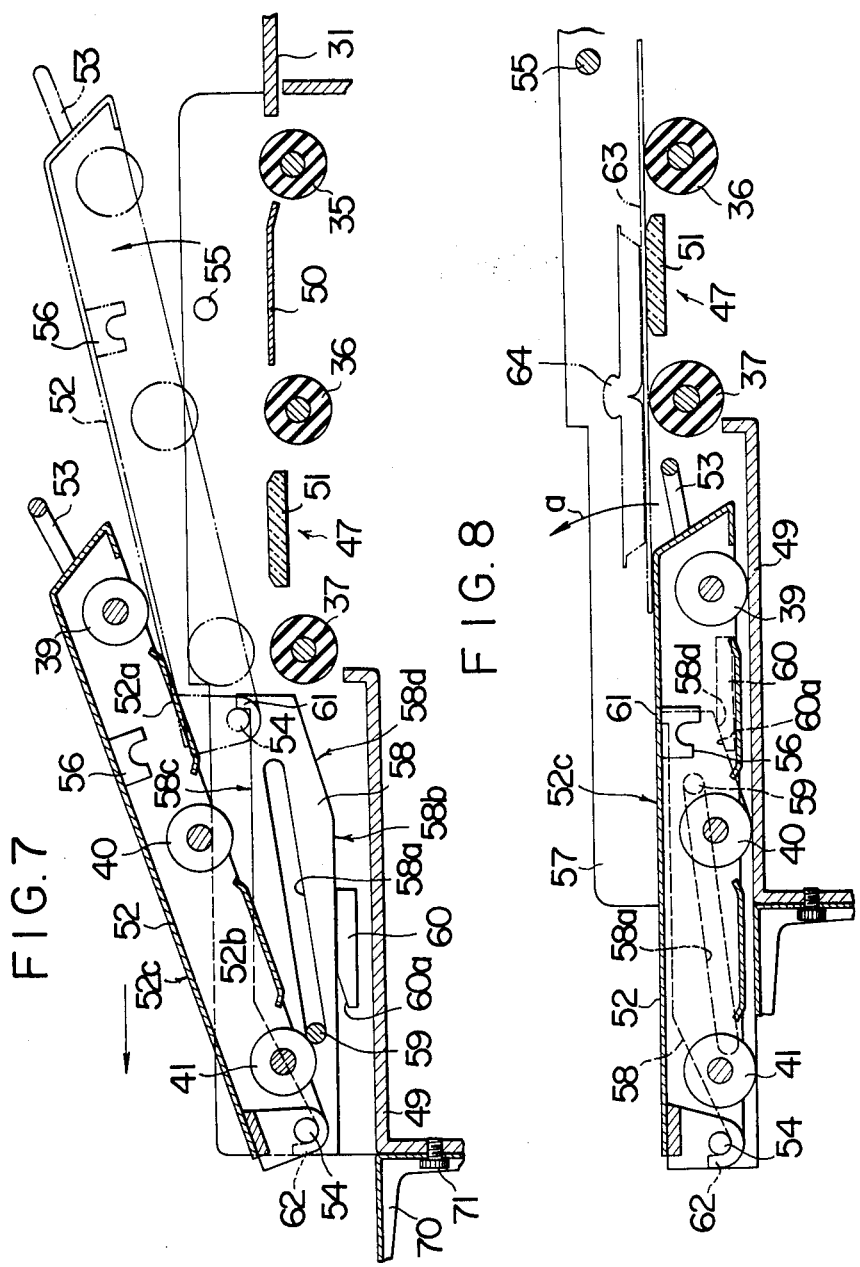

COPYING MACHINE

BACKGROUND OF THE INVENTION

The invention relates to a copying machine of the type involving a movement of an original, and more particularly to such a copying machine which permits a selective use of either a single sheet original or a file original, such as a book.

Referring to FIGS. 1 and 2 for a brief description of an exemplary original conveying mechanism of a copying machine in which either a single sheet original or a file original can be selectively copied, there are shown a plurality of drive rollers 1, 2 and 3 which are fixedly mounted in position and which are engaged by a plurality of driven rollers, 5, 6 and 7, respectively, which are in turn rotatably mounted on a frame 4. The driven rollers 5 to 7 can be moved away from or toward the drive rollers 1 to 3 by displacing the frame 4 as indicated by a 4A in FIG. 1 or a 4B in FIG. 2. A numeral 8 designate a guide plate for insertion of an original, a numeral 9 a guide plate and a numeral 10 a transparent glass plate, respectively.

When it is desired to copy a single sheet original, the arrangement shown in FIG. 1 is employed wherein the frame 4 is located so as to maintain the driven rollers 5 to 7 in engagement with the drive rollers 1 to 3, and an original A is fed into the nip therebetween.

A copying from a file original can be obtained by using the arrangement shown in FIG. 2 wherein the frame 4 is turned to a position 4B (or position 4A in FIG. 1), and a file original B is placed on an original carrier 11 for the purpose of copying.

As mentioned above, the frame 4 which supports the driven rollers has its position changed depending on the kind of the original. Though this does not present a problem with a single sheet original, it does for a file original, in which case it is absolutely necessary to move the frame 4.

In the prior art practice, the frame 4 has been moved out of interference with the original carrier by employing a hinge, associated with the frame 4 which permits it to be turned in a direction perpendicular to the direction of movement of the original, as shown at 4A in FIG. 1, or by turning it in the direction of movement of the original as shown at 4B in FIG. 2. Alternatively, the frame is detachably mounted on the machine body, or it is displaced upward when a copying from a file original is desired (see FIG. 1).

However, if a detachable frame is used, it is necessary to remove it from the machine body when a copying from a file original is desired, presenting a problem of finding a location on which it is to be placed. In addition, the replacement of the frame is troublesome, particularly for an operator of little strength. In addition, the arrangement shown in FIG. 1 has no definite position to which the frame is to be shifted. This presents a problem in the ease of operation, in particular with a large-sized copying machine. Furthermore, an upward movement of the frame results in increasing the size of the mechanism. Another disadvantage accrues from the fact that an operator usually stands by the original inlet of the copying machine for an efficient copying operation. However, with the arrangement shown in FIG. 2, the frame will have to be turned forwardly of the operator over an increased distance, which requires the operator exchanging his position to carry over the frame.

SUMMARY OF THE INVENTION

It is an object of the invention to provide a copying machine which eliminates the above mentioned disadvantages by providing an original conveying mechanism which is simple in construction and which maintains the frame for driven rollers accessible from an operator staying at a fixed position by arranging the frame to be movable in a direction parallel to the direction of movement of the original as copying from a file original is being made, the movement of the frame being facilitated by the use of a guide member.

BRIEF DESCRIPTION OF THE DRAWINGS

FIG. 7 is a similar view to FIG. 5 illustrating the operation thereof;

FIG. 8 is an elevational section of the embodiment shown in FIG. 3 when the frame is in its second position;

DETAILED DESCRIPTION OF PREFERRED EMBODIMENTS

Figure 3:
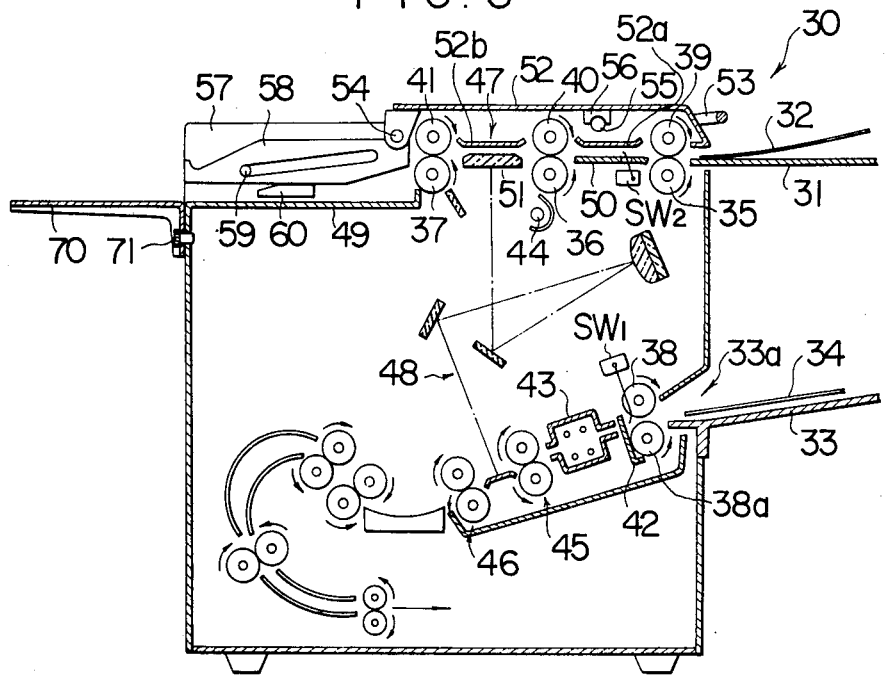
FIG. 3 is an elevational section of a copying machine constructed in accordance with one embodiment of the invention.

Referring to FIG. 3, there is shown a body 30 of a copying machine which includes a table 31 on which a single sheet original 32 is supplied, and another table 33 on which a copy sheet 34 is supplied. When a main switch, not shown, is turned on, drive rollers 35, 36, 37 and 38 are driven for rotation in the respective directions indicated. The drive rollers 35 to 37 are maintained in engagement with driven rollers 39 to 41, respectively. A roller 38a, which forms a pair with the drive roller 38, is normally moved away therefrom. When a copy sheet 34 is fed into an inlet 33a, its leading edge actuates a switch $SW_1$ and comes to a stop at the position of a stop 42. A single sheet original 32, which is fed onto the table 31, is fed by the cooperation of the drive roller 35 and driven roller 39, with its leading edge operating a switch $SW_2$. The actuation of both switches $SW_1$ and $SW_2$ causes a solenoid, not shown, to bring the roller 38a into engagement with the drive roller 38 and to move the stop 42 downward. A charger 43 and a lamp 44, which constitutes a source of illuminating light are turned on as the stop 42 is operated in this manner.

The copy sheet 34, being freed from the detent by the stop 42, is uniformly subjected to a blanket charging, and is exposed through an optical system 48 to an image of the single sheet original 32 while the sheet 34 is being conveyed by pairs of rollers 45, 46 as the original passes through an original illumination station 47. After the formation of an electrostatic latent image thereon, the copy sheet is subjected to the steps of developing, fixing and drying before it is discharged out of the machine.

On the other hand, after passage through the original illumination station 47, single sheet original 32 is conveyed by a pair of rollers 37, 41 to be delivered onto a delivery table 49.

Figure 4:
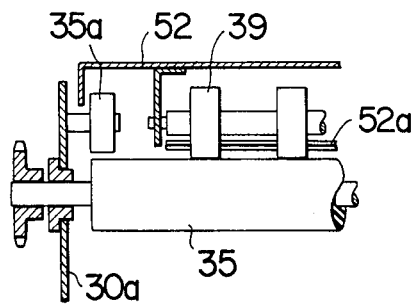
FIG. 4 is a side elevation, partly in section, of a drive roller and driven rollers, illustrating the relative position thereof.

Describing the conveying mechanism for the single sheet original 32 more specifically, each of the drive rollers 35 to 37 is rotatably mounted on a stationary support plate 30a of the copying machine as shown in FIG. 4, and is driven for rotation by drive means, not shown. Intermediate adjacent drive rollers, there are disposed an original guide 50 and transparent glass plate 51 which permits an illumination of the original.

On the other hand, each of the driven rollers 39 to 41 comprises a plurality of roller sections, which are rotatably mounted on a frame 52 which represents a support for the driven rollers (see FIG. 4). The frame 52 is closed at its top, serving as a top cover for the copying machine. Guide plates 52a, 52b for the single sheet original are fixedly mounted in the lower part of the frame 52 between adjacent driven rollers. At its front end, or toward the original inlet, (the right-hand side as viewed in FIG. 3), the frame 52 has a handle 53 fixedly mounted thereon. A pair of stub shafts 54 are secured to the opposite sides of the frame 52 toward its rear end, and extend outwardly.

Figure 1:
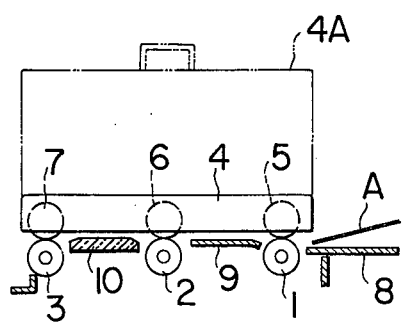
FIGS. 1 and 2 are elevational cross sections of parts of conventional arrangements.
Figure 5:
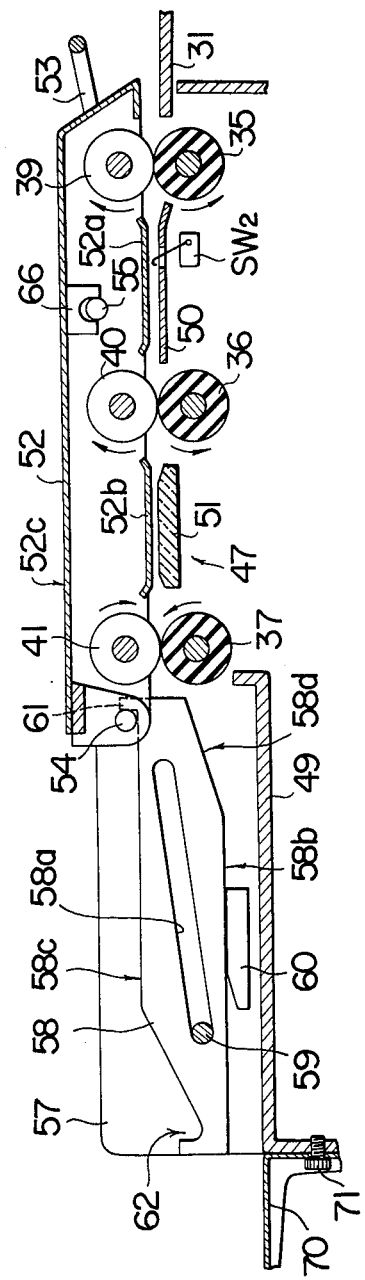
FIG. 5 is an elevational section of part of the embodiment shown in FIG. 3, illustrating the frame in its first position.

The frame 52 is mounted on the body 30 of the copying machine by initially disposing the driven rollers 39 to 41 in abutment against the respective corresponding drive rollers 35 to 37, and positioning the frame by engaging detent members 56, secured to the sides of the frame, with pins 55 which are fixedly mounted on a sideplate, not shown, of the body 30. Thus, the frame 52, which constitutes the top cover of the copying machine, is disposed to maintain the driven rollers in engagement with the drive rollers so as to be driven thereby. This represents a first position of the frame 52 (see FIGS. 1 and 5).

In the top region of the copying machine, a pair of sideplates 57, 57 (see FIGS. 5 to 7 and 10) are located downstream of the original illumination station 47, as viewed in the direction of movement of the original, these sideplates having guide pins 59, 59 and guides 60, 60 fixedly mounted thereon for movably supporting frame guide member 58. Each guide member 58 is formed with a downwardly extending, elongate slot 58a in which the guide pin 59 is loosely fitted, and has its lower edge 58b disposed in abutment against a guide 60. The front end (right-hand end, as viewed in FIG. 5) of each guide member 58 is formed with a projection 61 which is adapted to engage a stub shaft 54 that is fixedly mounted on the rear end of the frame 52, while the rear end of each guide member 58 is formed with a recess 62 which is also adapted to engage a stub shaft 54. During a copying operation from a single sheet original, or when the frame 52 is in its first position, each guide member 58 is located such that a guide pin 59 is in the rear end of the elongate slot 58a and the projection 61 is engaged with a stub shaft 54. During a movement of the frame 52 as will be described later, each stub shaft 54 is moved along the upper edge 58c of a guide member 58.

When an original carrier is required or where a copying from a file original is desired, the handle 53 is manually gripped and the frame 52 is rotated about the stub shafts 54 through an angle which is sufficient to disengage the detent member 56 from the pin 55, as shown in phantom lines in FIG. 7. The frame 52 in this position is moved to the left, as viewed in FIG. 7, by sliding the stub shafts 54 along the upper edge 58c of each guide member until the stub shafts 54 engage the recesses 62, whereupon the guide members 58 are moved, together with the frame 52, in a downward direction as a result of the guiding action of the guide pins 59 and the guides 60.

When each guide member 58 is brought to a position shown in FIG. 8 in which the guide pins 59 are situated at the front ends of the slots 58a and a lower bevelled edge 58d at the front end of each guide member 58 abuts against a rear bevelled surface 60a of a guide 60, the members 58 come to a stop at this position, in which they are temporarily fixed. When each guide member 58 is located in this manner, the frame 52, which has been manually held by the handle 53 at its front end, may now be lowered into a horizontal position in which the driven rollers rest on the delivery table 49.

FIG. 8 shows a second position of the frame 52 which represents a final home position when copying from a file original. It will be understood that such position is reached by a translational movement of the frame 52 from the position shown in FIG. 5. The amount of movement is chosen so that the upper surface 52c of the frame 52 which assumes this position is coplaner with the top extremity of the drive rollers 35 to 37. By the engagement between the stub shafts 54 and the recesses 62 in the guide members 58, the frame 52 is temporarily fixed in this position.

The frame 52 may also be placed on the delivery table 49 by bringing suitable legs thereof in abutment against the table rather than bringing the driven rollers in abutment against the table. Alternatively, the driven rollers 35 to 37 may be mounted so as to be movable in the vertical direction while being resiliently urged downward, and the sideplates of the frame 52 may be held in abutment against the delivery table 49 when it is placed thereon, as shown in FIG. 8.

A movement of the frame 52 may be facilitated by mounting a roller on each stub shaft 54, which roller may be rolled along the upper edge 58c of a guide member 58. Similarly, rollers may be mounted on the guide pins 59 and the guides 60 to facilitate a movement of the frame.

The machine is ready for a copying operation from a file original when the frame 52 is located as shown in FIG. 8. A file original 64 is placed on an original carrier 63 which comprises a transparent sheet material, and the carrier may be fed into the original inlet, whereupon it is conveyed by being held between the drive roller 35 and rotatable rollers 35a which are disposed in opposing relationship therewith. It should be understood that a similar arrangement is employed for the remaining drive rollers. After passage through the original illumination station 47, the carrier 63 moves over to the upper surface 52c of the frame 52 where it stops.

A sliding movement of the original carrier 63 over the upper surface 52c of the frame 62 and its placement thereon after completion of a copying operation from a file original may result in damage being caused to the transparent material of the carrier 63. To avoid this, the upper surface 52c of the frame 52 may be formed with a plurality of ribs 65 (see FIG. 6) in a region where the carrier 63 runs, thereby preventing damage to the carrier and minimizing the friction between the frame and the carrier.

After the completion of a copying operation from a file original, the handle 53 of the frame 62 is manually gripped and raised in the direction indicated by an arrow a (FIG. 8) and then pulled to the right, as viewed in FIG. 3, toward the operator standing by the original inlet. In this manner, the stub shafts 54 are moved along the upper edge 58c of the guide member 58, and as they engage the projection 61 of each guide member 58, the member 58 moves together with the frame while being guided by the guide pins 59 and the guides 60. When such movement of the guide members 58 is constrained by the guide pins 59 as shown in FIG. 7, the frame 52 assumes the position shown in phantom lines in this Figure, whereupon it can be lowered to bring the detent members 56 into engagement with the pins 55 to fix it in its first position, thus making the machine ready for a copying operation from a single sheet original.

Figure 11:
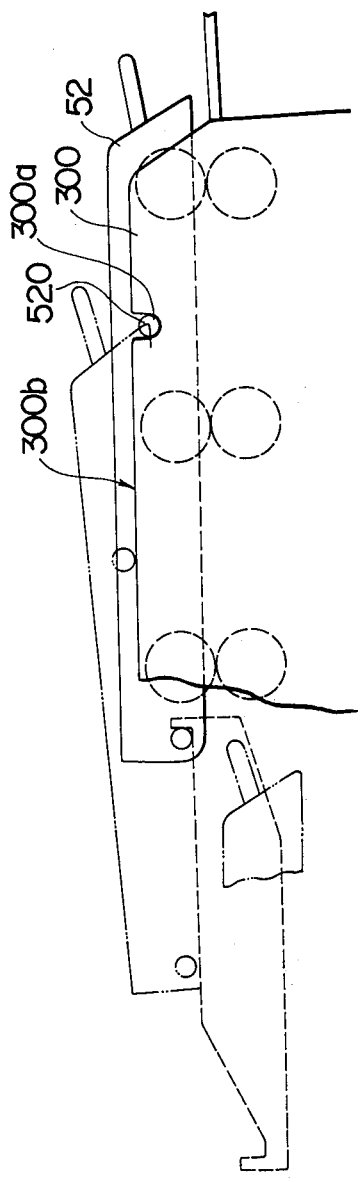
FIG. 11 is a schematic side elevation of part of another embodiment of the invention.
Figure 9:
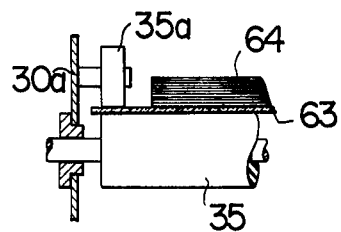
FIG. 9 is a side elevation, partly in section, of conveyor means of the original carrier.
Figure 10:
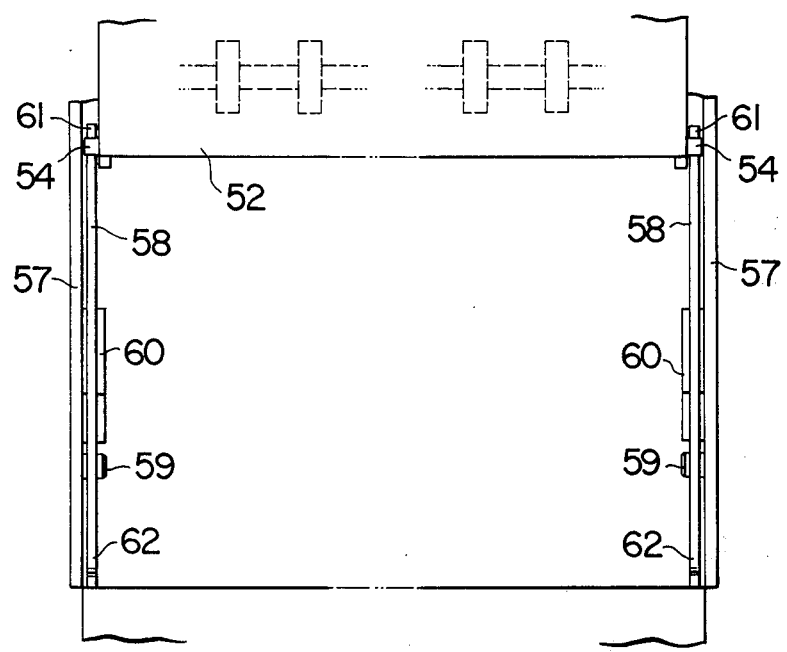
FIG. 10 is a plan view of the guide member associated with a support.

Instead of raising the front end of the frame by manually gripping the handle thereof when the frame is moved during a copying operation from a file original, a notch 300a may be formed in a suitable sideplate 300 (FIG. 11) for locating the frame 52 in its first position which is utilized during a copying operation from a single sheet original, and the frame 52 may be provided with a pin 520 which is adapted to engage the notch 300a. When moving the frame, the pin 520 may be moved along the upper edge 300b of the sideplate 300, thus facilitating the movement of the frame. It should be understood that a roller may be mounted on the pin 520.

The tables 31 and 33, which are utilized for supplying an original and a copy sheet into the machine, respectively, are detachable from the body 30 of the copying machine. In a similar manner, an original receptacle 70 which is disposed in contiguous relationship with the delivery table 49, as viewed in the direction of movement of the original, is detachably mounted on the body by utilizing pins 71. Thus, when the machine is not in use, the overall size of the body may be reduced by dismounting these components.

While the guide members 58 have been shown as mounted on the body in an exposed condition, they may be covered with suitable means. In the embodiment shown, the guides 58 for the frame 52 have been described as slidable members, but a non-slidable guide members may be utilized provided an extension of the guide members to the exterior of the body (to the left-hand end position of the guide member 58 shown in FIG. 8) is allowable.

While in the embodiment shown, the frame 52 is moved rearwardly of the original illumination station along the direction of movement of the original, it would undergo a translational movement forwardly of the illumination station along the direction of movement of the original if the original illumination station 47 is located intermediate the drive rollers 35 and 36, as viewed in FIG. 3.

Figure 2:
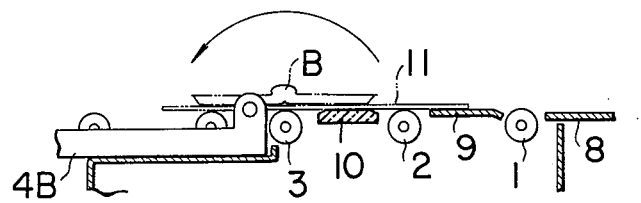
Figure 6:
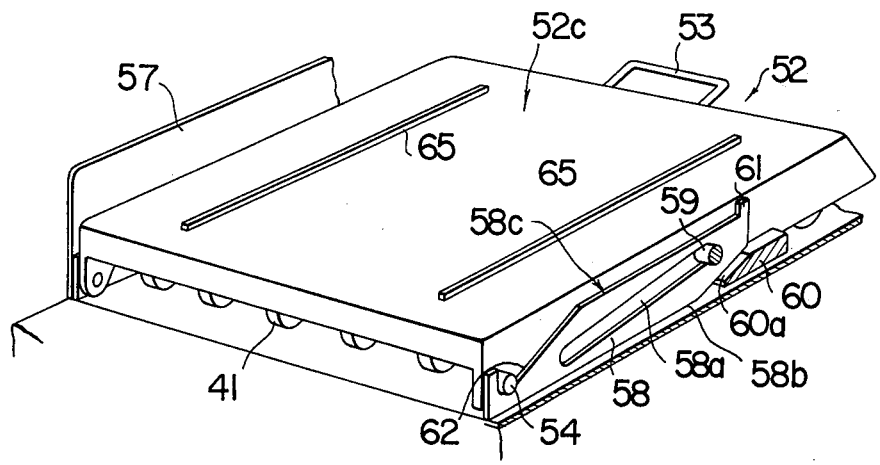
FIG. 6 is a perspective view of the frame when it is in a position to receive a file original thereon.

From the foregoing description, it will be appreciated that the copying machine according to the invention is provided with an original conveying mechanism which permits the frame, carrying driven rollers, to be translated in the direction of movement of the original during a copying operation from a file original. During such movement, the movement of the frame is guided by the guide members, and the frame remains within the reach of an operator, thus facilitating an operation or movement of the frame. When an operator stands by the original inlet of the machine body, for example, it is only necessary for the operator to reach his hand to the handle 53 of the frame 52 as shown in FIG. 8, when it is desired to move the frame to its second position. However, in the arrangement shown in FIG. 2 in which the frame 4 must be turned, the operator will have to reach his hand to a position which corresponds to the left-hand end of the frame 52 as viewed in FIG. 8. By comparison, the necessary reach is reduced to one-half, according to the invention. While in the prior art arrangement shown in FIG. 2, the turning motion of the frame can be easily achieved if the operator changes his position, this reduces the operational efficiency. In addition, the fact that the operator is allowed to remain in position when moving the frame represents an ease of operation, particularly when the size of the overall copying machine is increased.

What is claimed is:

1. A copying machine, which permits a selective use of either a single sheet original or a file original comprising:
   a. main body
   b. a plurality of drive rollers disposed on the underside of a path of movement of an image bearing surface of an original to be copied with their axes extending transversely of said path, and mounted on said body for rotation,
   c. marginal driven rollers each mounted on said body on the other side of said path for cooperation with end portions of a respective drive rollers,
   d. a transparent sheet member arranged to be fed between said drive rollers and said marginal driven rollers from an inlet of said path, thereby to be moved along said path while receiving a file original thereon,
   e. intermediate driven rollers, each engageable with the remaining intermediate portions of said drive rollers on the other side of said path, to form nips therebetween for moving a single sheet original fed from said path inlet,
   f. frame means, mounting said intermediate driven rollers thereon, movable between a first position, in which said intermediate driven rollers engage with respective drive rollers, and a second position, in which it is closely juxtaposed to the region in which said drive rollers are disposed along a direction parallel to said path while its top extremity is below an extension of said path,
   g. guide means guiding the movement of said frame means between said first and second positions without substantial change in the orientation of said frame means,
   h. handle means provided at a front end of said frame means corresponding to said path inlet to be gripped by an operator to manually move said frame means between said first and second positions, and
   i. means for scanning an image of an original during its movement along said path.

2. A machine according to claim 1, wherein said guide means comprises a follower attached to the rear end of said frame means and a guide member mounted on said body and having a guide surface at its upper edge for receiving said follower, said guide surface extending generally parallel to said extension of said path and having raised portions at its respective ends for limiting movement of said follower thereover.

3. A machine according to claim 2, wherein said guide surface is inclined downwardly adjacent the end thereof remote from the region in which said drive rollers are disposed.

4. A machine according to claim 2, further comprising means mounting said guide member on said body for reciprocal movement, in a direction generally parallel to said extension of said path, by a predetermined distance.

5. A machine according to claim 1, further comprising a table for receiving sheet originals delivered after scanning and wherein said frame means, in the second position, is placed on said table.

6. A machine according to claim 1, wherein said frame means comprises a top cover plate which is coplaner with said path when in the second position, thereby serving as means for supporting the leading end of said transparent sheet member during movement for scanning.

7. A machine according to claim 6, wherein said top cover plate has its top surface, a pair of guide rails for receiving opposite marginal portions of said transparent sheet member.

* * * * *